United States Patent [19]

Seip

[11] 3,909,074
[45] Sept. 30, 1975

[54] BRAKE FORCE DISTRIBUTOR
[75] Inventor: Hermann Seip, Bad Vilbel, Germany
[73] Assignee: ITT Industries, Inc., New York, N.Y.
[22] Filed: Sept. 9, 1974
[21] Appl. No.: 504,229

[30] Foreign Application Priority Data
Nov. 22, 1973 Germany............................ 2358190

[52] U.S. Cl............................................. 303/22 R
[51] Int. Cl.² .......................................... B60T 8/22
[58] Field of Search........... 303/21 AF, 22 A, 22 R, 303/23 A, 23 R; 188/195

[56] References Cited
UNITED STATES PATENTS
3,762,776 10/1973 Kawabe et al. .................... 303/22 R
3,841,713 10/1974 Seip ................................. 303/22 R Primary Examiner—Duane A. Reger
Attorney, Agent, or Firm—John T. O'Halloran; Menotti J. Lombardi, Jr.; Alfred C. Hill

[57] ABSTRACT

A brake force distributor includes a cylinder and a stepped piston disposed in the cylinder and biassed toward one end position of the piston by a control force. The piston is provided with a pressure medium passage internally of the piston to connect the input to the output of the distributor under control of a valve disposed in the passage, the control of the valve being in accordance with the magnitude of the control force. To ensure full brake pressure at the output of the distributor when the control force fails, the piston is moved to the other end position of the piston and provides a direct connection between the input and output of the distributor along the periphery of the piston.

1 Claim, 2 Drawing Figures

BRAKE FORCE DISTRIBUTOR

BACKGROUND OF THE INVENTION

This invention relates to brake force distributors and more particularly to brake force distributors ensuring full brake pressure at the wheel brake cylinders in the event of failure of the distributor control force. Brake force distributors including a stepped piston which is slidably arranged in a cylinder and biassed in one direction by a control force; two pressure chambers separated from one another by the stepped piston, one pressure chamber communicating with a master cylinder, and the other pressure chamber communicating with the wheel brake cylinders of a hydraulic brake system; a valve controlling a pressure-medium passage in the stepped piston in accordance with the magnitude of the control force; and an arrangement to ensure that full brake pressure is applied to the wheel brake cylinders in the event of failure of the control force are disclosed in copending applications of H. Seip, Ser. No. 301,040, filed Oct. 26, 1972, Ser. No. 433,034, filed Jan. 14, 1974 and Ser. No. 434,451, filed Jan. 14, 1974.

SUMMARY OF THE INVENTION

An object of the present invention is to provide a brake force distributor which ensures that the full brake pressure is applied to the wheel brake cylinders in the event of failure of the control force employing a simpler arrangement than employed in the above identified copending applications.

A feature of the present invention is the provision of a brake force distributor comprising: a cylinder having a longitudinal axis; a stepped piston disposed coaxial of the axis in a slidably sealed relation with the interior surface of the cylinder; a first pressure chamber within the cylinder; a second pressure chamber within the cylinder; the first and second pressure chambers being separated by the piston; a pressure medium input connected to the first chamber; a pressure medium output connected to the second chamber; a pressure medium passage within the piston coaxial of the axis connecting the first and second chambers; first means to provide a control force to bias the piston toward the second chamber; a valve disposed in the passage to control the passage of pressure medium from the input to the output in accordance with the magnitude of the control force; and second means included as a part of the cylinder to directly connect the first and second chambers upon failure of the control force.

According to an advantageous embodiment of the present invention, the cylinder includes a portion having a diameter greater than that of the largest diameter of the stepped piston to provide a connection between the two pressure chambers along the outer periphery of the stepped piston when the stepped piston is moved into the larger diameter portion of the cylinder upon failure of the control force.

The advantages of the present invention in particular lie in that, in contrast to the brake force distributor according to the above cited copending applications, it avoids the necessity for a valve to control a direct hydraulic connection between input and output. This both simplifies and reduces the costs of the brake force distributor manufacturing.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

For the present description, a load-dependent brake force distributor was chosen. However, it should be noted that the problem of control force failure also exists with pressure-dependent brake force distributors so that the scope of the invention is not to be restricted to load-dependent distributors.

Figure 1:
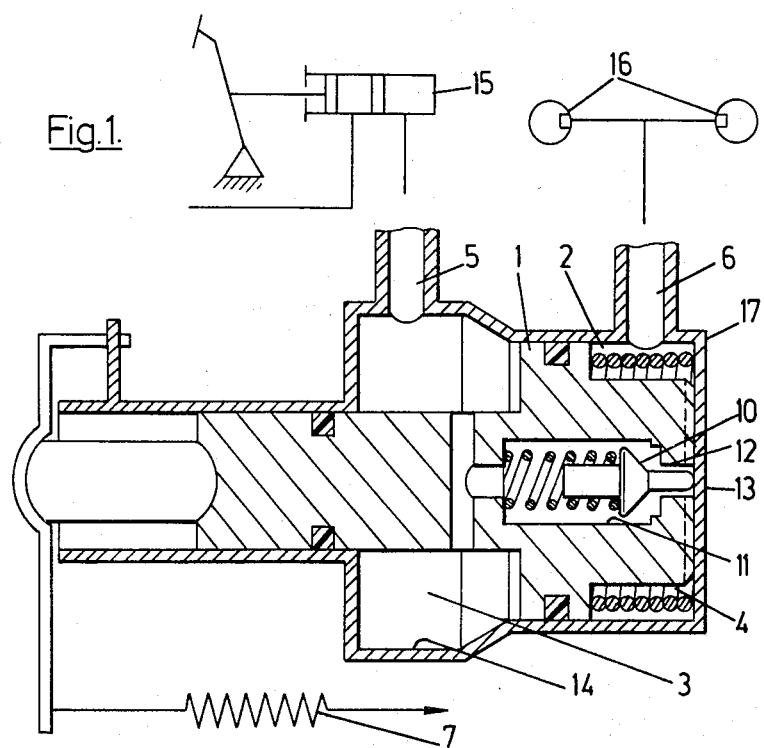
FIG. 1 is a longitudinal cross-sectional view of a brake-force distributor constructed in accordance with the principles of the present invention.

As shown in FIG. 1, the brake force distributor includes a stepped piston 1 which is axially slidable in a cylinder 2. The stepped piston 1 defines in cylinder 2 pressure chambers 3 and 4. Via a pressure - medium inlet 5, pressure chamber 3 communicates with a master cylinder 15 for brake actuation, while pressure chamber 4 connects with brake cylinders 16 via a pressure-medium outlet 6.

Via a spring 7, a lever 8 and a pressure member 9, the stepped piston 1 is biassed in the direction of the pressure-medium outlet 6 in dependence on the axle load of the vehicle which is intended for use with the brake force distributor. A valve 10, which controls a pressure-medium passage 11, provides in the brake force distributor position shown a connection between the two pressure chambers 3 and 4. For this purpose, valve 10 has a valve-closure element 12 with a tappet 13 projecting out of stepped piston 1.

Figure 2:
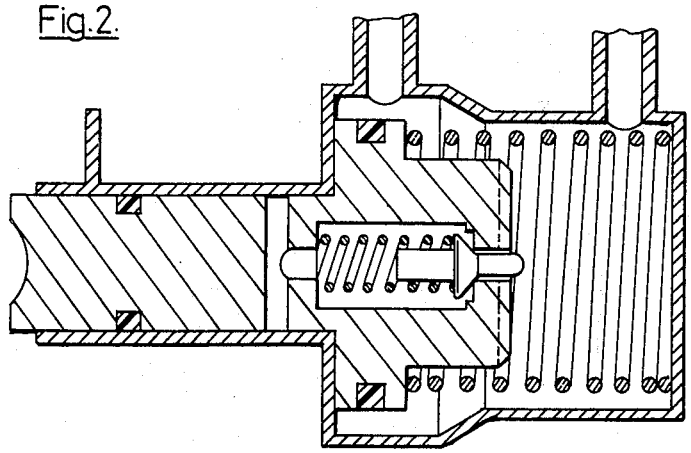
FIG. 2 is a longitudinal cross-sectional view of the brake-force distributor of FIG. 1 in a position which ensues upon the failure of the control force.

On the side of the pressure-medium inlet 5, cylinder 2 has a section 14 with a diameter greater than that of the stepped piston. As can be seen in FIG. 2, this enables a connection of the two pressure chambers 3 and 4 to be created along the outer periphery of stepped piston 1, if the piston is in its left-hand end position as viewed in the drawing. A weak spring 17 slightly biasses stepped piston 1 in the direction of pressure-medium inlet 5. Instead of providing a section with a greater diameter, it is also possible to provide a longitudinal groove extending over part of the length of cylinder 2.

Operation of the brake force distributor described above is as follows:

If the control device including spring 7, lever 8 and pressure member 9 functions properly, the pressure medium fed via inlet 5 first flows along the valve-closure element 12 through passage 11 until it reaches, via the outlet 6, the brake cylinders 16 of the vehicle brakes. If the pressure in chamber 4 has reached a predetermined magnitude, stepped piston 1 will move against the force of spring 7 towards the pressure-medium inlet 5, i.e., to the left in the drawing. This causes valve-closure element 12 to close passage 11 so that further pressure buildup in chamber 4 and, consequently, in brake cylinders 16 is exclusively determined by the surface ratio of stepped piston 1. The mode of operation as described above fully corresponds to that of conventional brake force distributors.

If in the brake force distributor herein described, spring 7 breaks, then stepped piston 1 will be moved to the left towards inlet 5, thereby being driven by the pressure in chamber 4 and with the assistance of spring 17. In the stepped-piston end position, piston 1 will be situated in the section 14 having the enlarged diameter. This permits pressure medium to flow from inlet 5 along the outer periphery of stepped piston 1 into chamber 4 and from there further to brake cylinders 16 via pressure-medium outlet 6. In this piston end position, separation of the two pressure chambers 3 and 4 is abolished, thereby ensuring that the full braking pressure is applied to wheel cylinders 16. The conventional function of the brake force distributor, i.e., to reduce the brake pressure, is thus cancelled in the event of a failure of the control force, for instance, upon a breakage of spring 7, so that in such a case the brake system will operate as if no brake force distributor were provided.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake force distributor comprising:
   a cylinder having a longitudinal axis;
   a stepped piston disposed coaxial of said axis in a slidably sealed relation with the interior surface of said cylinder;
   a first pressure chamber within said cylinder;
   a second pressure chamber within said cylinder;
   said first and second pressure chambers being separated by said piston;
   a pressure medium input connected to said first chamber;
   a pressure medium output connected to said second chamber;
   a pressure medium passage within said piston coaxial of said axis connecting said first and second chambers;
   first means to provide a control force to bias said piston toward said second chamber;
   a valve disposed in said passage to control the passage of pressure medium from said input to said output in accordance with the magnitude of said control force; and
   second means included as a part of said cylinder to directly connect said first and second chambers upon failure of said control force;
   said cylinder including a first portion having a first given inner diameter adjacent said output, a second portion having a second given inner diameter adjacent said input greater than said first given diameter and a third portion interconnecting said first and second portions, and
   said piston including a first portion having a third given outer diameter less than said first given inner diameter to provide said second chamber and a second portion having a fourth given outer diameter equal to said first given inner diameter, said piston being maintained in said first portion of said cylinder during the presence of said control force and moved to said second given portion of said cylinder upon failure of said control force to connect said first and second chambers along the outer periphery of said piston,
   said second portion of said cylinder providing said second means.

* * * * *